United States Patent Office 3,408,419
Patented Oct. 29, 1968

3,408,419
ISOPARAFFIN ALKYLATION PROCESS
Raymond R. Herber, Clarendon Hills, and Kenneth D. Vesely, La Grange Park, Ill., assignors to Universal Oil Products Company, Des Plaines, Ill., a corporation of Delaware
No Drawing. Filed Apr. 5, 1966, Ser. No. 540,213
4 Claims. (Cl. 260—683.51)

ABSTRACT OF THE DISCLOSURE

Alkylation of an isoparaffin with an olefin utilizing an anhydrous HF catalyst in admixture with an organic diluent which is formed by reacting isobutylene with anhydrous HF and having a molecular weight of 200–500. The diluent used in amounts less than 25% by weight of the HF catalyst enhances the octane number of the alkylate.

---

This invention relates to a process for the production of an isoparaffin-olefin reaction product whereby an alkylate product of enhanced product quality subsequently is obtained.

Production of higher molecular weight isoparaffins having valuable anti-knock properties and therefore suitable for use in automotive and aviation fuels is of considerable importance in the petroleum refining industry. Furthermore, the introduction of automobile engines of high compression ratio has necessitated the utilization of high anti-knock fuels in these engines to obtain maximum horsepower output therefrom. Thus, the demand for higher and higher octane number fuels has led to increased use of higher molecular weight isoparaffins as blending agents and gasolines.

A convenient source of such higher molecular weight isoparaffins is the catalytic alkylation of low boiling isoparaffins such as isobutane with olefins, such as for example, propylene, butylenes, amylenes and mixtures thereof. It is therefore an object of this invention to provide a process which will yield even higher octane motor fuels than has been previously accomplished in the prior art. A still further object of this invention is to provide a process for the production of an isoparaffin-olefin reaction product whereby a relatively clean reaction system with less side reactions is utilized to produce extremely high octane alkylates with end points well below the 400° F. specification for motor fuel alkylate.

In one embodiment, this invention relates to an alkylation process which comprises reacting an isoparaffin with an olefin at substantially anhydrous alkylating conditions in contact with a catalyst comprising substantially anhydrous hydrogen fluoride in admixture with less than about 25% by weight of organic diluent having a molecular weight of between 200 and 500 and subsequently recovering a high octane alkylate product.

Another embodiment of this invention relates to an alkylation process which comprises reacting an isoparaffin with an olefin at substantially anhydrous alkylating conditions including a temperature in the range of from about 0° F. to about 200° F., a pressure in the range of from about atmospheric to about 40 atmospheres, a contact time of from about 30 seconds to about 1200 seconds, an acid to hydrocarbon volume ratio from about 0.5 to about 20.0, an isoparaffin to olefin mol ratio of from about 3:1 to about 20:1 and not more than 1% by weight of water in contact with a catalyst comprising substantially anhydrous hydrogen fluoride in admixture with less than about 25% by weight of organic diluent having a molecular weight of between 200 and 500.

A specific embodiment of this invention relates to an alkylation process which comprises reacting isobutane with a mixture of $C_4$ olefinic hydrocarbons at substantially anhydrous alkylating conditions including a temperature in the range of from about 0° F. to about 200° F., a pressure in the range of from about atmospheric to about 40 atmospheres, a contact time of from about 30 seconds to about 1200 seconds, an acid to hydrocarbon volume ratio of from about 0.5 to about 20.0, an isoparaffin to olefin mol ratio of from about 3:1 to about 20:1 and not more than 1% by weight of water in contact with a catalyst comprising substantially anhydrous hydrogen fluoride in admixture with less than about 25% by weight of organic diluent consisting essentially of the reaction product of isobutylene and substantially anhydrous hydrogen fluoride and having a molecular weight of between 200 and 500.

Other objects and embodiments of the present invention will become apparent in considering the specification as hereinafter set forth.

As stated hereinabove, this invention relates to a process for the production of an alkylate product of enhanced product quality. Although the present process is particularly applicable to the alkylation of isobutane with a butylene-containing olefinic feed stock, the process is also applicable to other isoparaffinic and other olefinic hydrocarbon feed stocks to produce motor fuel or aviation alkylates or higher boiling aliphatic hydrocarbon products. Thus, other paraffinic hydrocarbons such as isopentane, one or more of the isohexanes, or mixtures of the aforementioned isoparaffins, branched-chain heptanes and other aliphatic hydrocarbons of branched type and chain structure may be utilized as feed stock. Similarly, as olefinic reactants, the normally gaseous olefins including propylene, 1-butene, 2-butene, isobutylene, the isomeric amylenes, the hexenes, the heptenes, and higher molecular weight olefinic hydrocarbons and mixtures thereof may be utilized as the olefin alkylating agent in the process.

The alkylation reaction is conducted so that the isoparaffin is reacted with an olefin at substantially anhydrous alkylating conditions in contact with a catalyst comprising substantially anhydrous hydrogen fluoride in admixture with less than about 25% by weight of organic diluent having a molecular weight of between 200 and 500. By the term "substantially anhydrous alkylating conditions" as used throughout the specification and appended claims, it is intended to include a temperature in the range of from about 0° F. to about 200° F. and preferably a temperature in the range of from about 30° F. to about 110° F., a pressure in the range of from about atmospheric to about 40 atmospheres, a contact time of from about 30 seconds to about 1200 seconds and preferably a contact time of from about 100 seconds to about 800 seconds, an acid to hydrocarbon volume ratio of from about 0.5 to about 20.0, an isoparaffin to olefin mol ratio of from about 3:1 to about 20:1 and not more than 1% by weight of water.

As stated hereinabove, the catalyst comprises substantially anhydrous hydrogen fluoride in admixture with less than about 25% by weight of organic diluent having a molecular weight of between 200 and 500. The organic diluent is usually made external to the alkylation unit by the reaction of isobutylene with anhydrous hydrofluoric acid. In one method of making the organic diluent, one to two volumes of isobutylene is bubbled into a vessel at approximately 50 p.s.i.g. which contains one volume of hydrofluoric acid. A temperature rise of between about 20 to about 50° F. is observed as the polymerization-cyclization takes place. This organic diluent, which is acid soluble, is then added to the acid circulating stream of the typical hydrogen fluoride alkylation unit. We have found that the organic diluent, in order to be of significant usefulness, must have a molecular weight of between 200 and 500. In an alternative method for producing this organic diluent, hydrofluoric acid may be recycled in an alkylation reactor-settler system at a steady rate. Isobutylene may be charged on temperature control to the reactor, contacted with the acid, reacted, and the reaction products leaves the reactor at a higher molecular weight than the feed on level control. The reactor pressure thus will be the vapor pressure of the isobutylene. The organic diluent-containing hydrofluoric acid now contacts a basic solution in which the hydrogen fluoride is neutralized and the organic diluent freed from the acid. The potassium hydroxide or other base is added to the caustic tower on pH control. External cooling is available if necessary on the caustic tower. The now neutralized or basic organic diluent leaves the caustic tower on level control and is washed countercurrently in a water wash tower. The organic diluent then flows to storage through catalytically inert drying means on level control for use in the alkylation process itself when desired.

The process of the present invention for the production of an isoparaffin-olefin reaction product whereby an alkylate product of enhanced product quality is obtained is best described by the following example. The composition of the alkylation feed stream utilized, in mol percent, is as follows: ethane, trace; propane, 0.3; propylene, 0.1; butylenes, 5.1; isobutane, 86.1; normal butane, 8.3; and pentanes, 0.1. Organic diluent is made external to the alkylation unit by the polymerization-cyclization reactions of isobutylene with anhydrous hydrogen fluoride so that an organic diluent having a molecular weight of 262 is achieved. This organic diluent is further characterized by an API gravity of 30.3, a bromine number of 169, a diene number of 86.6 and an initial boiling point of 320° F. and a 95% boiling point of 755° F. This organic diluent was then added to the plant in admixture with the substantially anhydrous hydrogen fluoride acid so that the promoted acid concentration was maintained at 80.7% HF, and the water content was limited to 0.8%. The acid to hydrocarbon volume ratio was maintained at approximately 9.0. The isobutane to olefin mol ratio was set at about 17.0 and the reactor temperature was maintained at about 45° F. Contact time in the alkylation reaction zone was maintained at about 785 seconds. Contact time is conveniently expressed in terms of space time which is defined as the volume of catalyst within the reaction or contacting zone divided by the volume rate per second of hydrocarbon reactants charged to the zone. The pressure on the alkylation reaction system was maintained at about 10 atmospheres to maintain the hydrocarbons and the catalyst in substantially liquid phase. A motor fuel alkylate product having an end point well below 400° F. and a leaded octane number greater than 113.5 was produced. Further, as set forth hereinafter, as will be evidenced by a comparison of alkylate products obtained from other units, and as are originally described in U.S. Patent No. 3,249,650, with the alkylate obtained from this unit, it is evident that a most superior alkylate has been produced in an economical operation.

Although different charge stocks were utilized, a valid comparison may still be made if one takes into account that a $C_4$ olefin-containing feed stock, from our actual experience, produces an alkylate having an F–1 clear octane number of only about 3 octane numbers higher than a $C_3$–$C_4$ olefin-containing feed stock at comparable operating conditions. Thus, if one has an alkylate of 91.6 F–1 clear octane number using a $C_3$–$C_4$ olefin-containing feed stock, it is comparable to a 94.6 F–1 clear octane number produced by alkylating a $C_4$ olefin-containing feed stock.

In Table I, which follows, 3 alkylates are compared. Alkylates "C" and "A" were produced in modern hydrogen fluoride alkylation plants while Alkylate "D" was produced utilizing the process of the present invention as described hereinabove. It should be recalled at this point, that although Alkylate "C" in Table I has a 91.6 F–1 clear octane number and "A" has a 94.0 F–1 clear octane number, for comparison purposes, these are respectively viewed as 94.6 and 97.0 F–1 clear octane numbers because of feed stock differences as explained above. It will be seen that Alkylate "D" produced by the process of this invention has a 98.9 F–1 clear octane number. Immediately, it is seen that a relative gain of at least 1.9 octane numbers is achieved by this invention.

Examination of the composition breakdowns of the alkylates produced presented in Table I, which follows, indicates that the prime difference between the alkylates was the extent of byproduct formation. The alkylate produced by Plant "C" was high in isopentane and higher in materials heavier than the $C_8$'s. The alkylate produced by Plant "C" had a $C_9+$ fraction of 11.5 weight percent compared to 5.9 weight percent produced by Plant "A" and only 2.3 weight percent produced by Plant "D." Further comparisons of the $C_8$ fractions of the alkylates produced indicates that the alkylate produced by Plant "D" had a much more favorable distribution than that produced in either Plants "C" or "A." That is, there are 81.3 weights percent (of the total $C_8$'s) trimethylpentanes produced in alkylate from Plant "C" as compared to 84.8 weight percent (of the total $C_8$'s) trimethylpentanes in the alkylate produced by Plant "A" while the alkylate produced by the process of this invention in Plant "D" had 92.2 weight percent (of the total $C_8$'s) trimethylpentanes. Further, the end point of the alkylates indicates further that alkylates from Plants "C" and "A" had more of heavy ends than that of alkylate from Plant "D." The product composition of alkylate from Plant "D" indicates therefore a relatively clean reaction system with less side reactions and the enhanced product quality of the alkylate produced, that is, the alkylate octane number and the alkylate product composition, was not sacrificed at the cost of an economical operation.

TABLE I

| Plant | C | A | D |
|---|---|---|---|
| API gravity | 73.5 | 72.6 | 68.7 |
| RVP, pounds | 10.0 | 8.2 | |
| Engler, ° F.: | | | |
| I.B.P. | 95 | 101 | 203 |
| 10% | 136 | 158 | 212 |
| 30% | 192 | 200 | 217 |
| 50% | 211 | 210 | 220 |
| 70% | 231 | 236 | 222 |
| 90% | 326 | 243 | 231 |
| 95% | 400 | 315 | 241 |
| 99% | 406 | 362 | |
| E.P.% | 406 | 362 | 340 |
| Octane Number: | | | |
| F–1 Clear | 91.6 | 94.0 | 98.9 |
| +1 cc. TEL | 99.0 | 101.1 | 106.7 |
| +3 cc. TEL | 102.5 | 105.6 | 113.6 |
| Composition, Weight Percent: | | | |
| Isobutane | 0.3 | 0.1 | |
| Normal Butane | 5.7 | 7.4 | |
| Isopentane | 12.4 | 3.5 | 0.8 |
| Normal Pentane | 0.3 | | |
| 2,3-dimethylbutane | 3.5 | 2.5 | 0.7 |
| 2-methylpentane | 1.2 | 0.6 | 0.2 |
| 3-methylpentane | 0.5 | 0.3 | (1) |
| 2,2 and 2,4-dimethylpentane | 5.9 | 6.1 | 0.7 |
| 2,2,3-trimethylbutane | 0.1 | (1) | |
| 2-methylhexane | 0.3 | 0.2 | |
| 2,3-dimethylpentane | 13.6 | 16.4 | 1.5 |
| 3-methylhexane | 0.3 | 0.1 | |
| 2,2,4-trimethylpentane | 24.0 | 31.5 | 55.2 |
| 2,5-dimethylhexane | 2.2 | 2.0 | 1.4 |
| 2,4-dimethylhexane | 3.0 | 3.1 | 2.2 |
| 2,2,3-trimethylpentane | 0.3 | 0.6 | 0.7 |
| 2,3,4-trimethylpentane | 8.0 | 10.6 | 20.5 |
| 2,3,3-trimethylpentane | 3.8 | 5.5 | 10.1 |
| 2,3-dimethylhexane | 2.8 | 3.3 | 3.7 |
| 3,4-dimethylhexane | 0.3 | 0.3 | (1) |
| $C_9$'s | 3.4 | 0.8 | 2.3 |
| $C_{10}$'s | 4.8 | 2.9 | |
| $C_{11}$'s | 2.8 | 2.2 | |
| $C_{12}$'s | 0.4 | (1) | |
| $C_{13}$'s | 0.1 | | |
| Total | 100.0 | 100.0 | 100.0 |

[1] Trace.

Therefore, it is concluded that alkylate produced from Plant "D" utilizing the process of this invention is much superior in total product quality to those octanes produced from other modern hydrogen fluoride alkylation units in use today, without the utilization of the process of this invention.

We claim as our invention:

1. An alkylation process which comprises reacting an isoparaffin with an olefin at substantially anhydrous alkylating conditions in contact with a catalyst comprising substantially anhydrous hydrogen fluoride in admixture with less than about 25% by weight of organic diluent formed by the reaction of isobutylene with substantially anhydrous hydrogen fluoride and having a molecular weight of between 200 and 500, and subsequently recovering a high octane alkylate product.

2. The process of claim 1 further characterized in that said substantially anhydrous alkylating conditions include a temperature in the range of from about 0° F. to about 200° F., a pressure in the range of from about atmospheric to about 40 atmospheres, a contact time of from about 30 seconds to about 1200 seconds, an acid to hydrocarbon volume ratio of from about 0.5 to about 20.0, an isoparaffin to olefin mol ratio of from about 3:1 to about 20:1 and not more than 1% by weight of water.

3. The process of claim 2 further characterized in that said isoparaffin is isobutane and that said olefin is a mixture of $C_3$ and $C_4$ olefinic hydrocarbons.

4. The process of claim 2 further characterized in that said isoparaffin is isobutane and that said olefin is a mixture of $C_4$ olefinic hydrocarbons.

References Cited

UNITED STATES PATENTS

| 2,382,899 | 8/1945 | Newman | 260—683.48 |
| 3,253,054 | 5/1966 | Van Pool | 260—683.49 |

FOREIGN PATENTS

| 592,345 | 9/1947 | Great Britain. |

DELBERT E. GANTZ, *Primary Examiner.*

G. J. CRASANAKIS, *Assistant Examiner.*